May 8, 1956  M. H. L. SEDILLE  2,744,383
GAS TURBINE PLANT
Filed Nov. 3, 1952
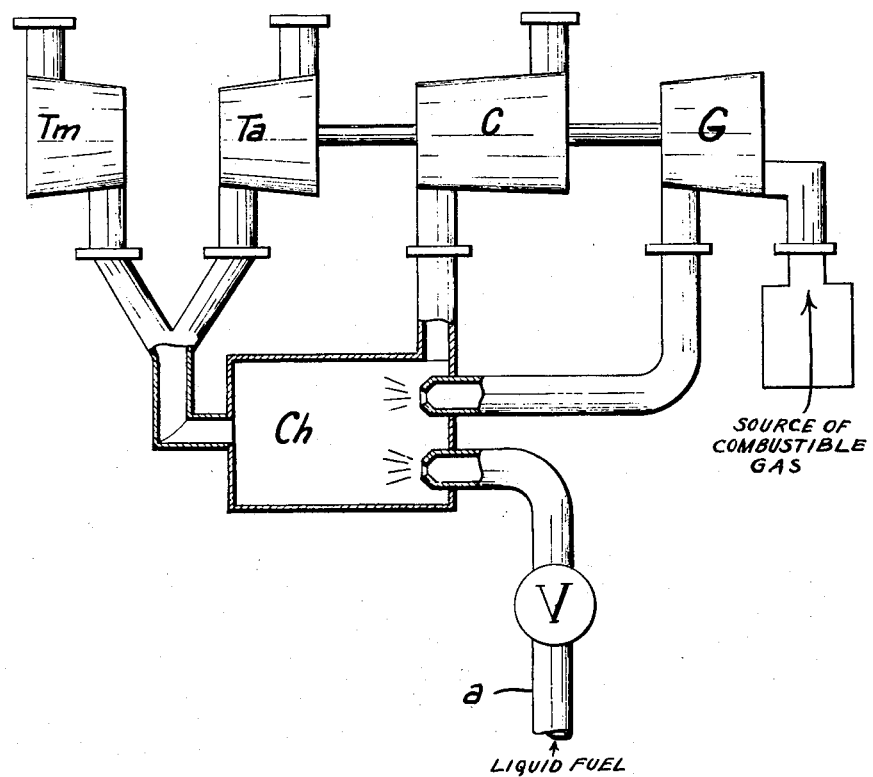
INVENTOR
Marcel H. L. Sedille
By: Watson, Cole, Grindle
   & Watson
       ATTORNEYS

United States Patent Office 2,744,383
Patented May 8, 1956

2,744,383
GAS TURBINE PLANT

Marcel Henri Louis Sédille, Paris, France, assignor to Societe Rateau (Societe Anonyme), Paris, France, a company of France Application November 3, 1952, Serial No. 318,477

Claims priority, application France March 29, 1941

1 Claim. (Cl. 60—39.15)

In a gas turbine plant operating on liquid or solid fuels, the fuel control is obtained with power losses which represent only a small fraction of the total power. In plants operating chiefly on gaseous fuels (blast furnace gas, coke furnace gas, producer gas, etc.) the gas compressor consumes an appreciable power which is a relatively important fraction of the total compression power. It is therefore important that the regulation of the fuel supply and the compression of air for the combustion chamber be effected with the smallest possible power loss, in order that the overall efficiency of the plant remains good.

This application is a continuation-in-part of the pending application Serial No. 580,257 filed February 28, 1945, now Patent No. 2,621,476 which is a division of my prior Patent application Serial No. 434,986, filed March 16, 1942 (now Patent No. 2,374,239).

The present invention has for its object a gas turbine plant operating on a fuel which is in gaseous form at ordinary temperature, the regulation of the fuel supply of this plant being effected with the smallest power loss.

The present invention has for another object a gas turbine plant of the type defined in which the operating point of the gas compressor and of the air compressor remains substantially constant and corresponds substantially to the value of optimum efficiency.

Other objects of the invention will be apparent in the following description given by way of example with reference to the drawing showing an embodiment of the invention.

In the plant shown on the drawing, a motive turbine $Tm$ receives its motive fluid in parallel with an auxiliary turbine $Ta$ driving a rotary air compressor C which delivers air under pressure into a combustion chamber $Ch$ adapted to heat this air before its admission into the turbines by means of a fuel which is in gaseous form at ordinary temperature. Both turbines are mechanically separated, and while the motive turbine $Tm$ has for its object to deliver useful external power, the auxiliary turbine $Ta$ drives the air compressor C and a rotary gas compressor G which compresses the gaseous fuel supplied to the combustion chamber.

It is known that a rotary compressor has a characteristic curve showing a point of maximum efficiency at a certain speed and for a constant intake pressure, as this is the case for the atmospheric air and for the gaseous fuel sucked in by the compressors C and G.

It is further known, and this can be demonstrated theoretically, that an auxiliary turbine driving the air compressor and mechanically separated from the motive turbine while supplied with hot air under pressure from a common combustion chamber can always be designed in such a manner that its rotary speed remains nearly constant, whatever be the power output required from and delivered by the motive turbine, i. e. whatever be the temperature of the air supplied to these turbines.

According to the invention, the auxiliary turbine $Ta$ is designed for running the air compressor C and the gas compressor G at a substantially constant rotary speed corresponding to the point of their characteristic curve at maximum efficiency.

The quantity of gaseous fuel delivered to the combustion chamber remaining thus unchanged, it is necessary to provide for an extra supply of thermal energy, in case an increase in the power output is required from the motive turbine. This extra amount of thermal energy is obtained, according to the invention, by means of a liquid fuel supplied directly to the combustion chamber $Ch$ through the pipe $a$ on which a throttle valve V allows the regulation of the quantity of the extra fuel supply. The air compressor has then to be designed for delivering into the combustion chamber a constant quantity of air which is sufficient for the combustion of the total fuel suppy corresponding to the maximum thermal energy that the motive turbine can transform into useful power.

In the embodiment shown on the figure, the gas turbine plant is of a definite type. However, the invention applies to all other types of gas turbine plants operating chiefly on gaseous fuel, whatever turbine arrangements and groupings are adopted, whether refrigerating means, regenerators, reheaters etc. are utilized or not.

What I claim is:

In a gas turbine plant, the combination of a motive turbine for delivering useful power, a rotary air compressor mechanically separated from said motive turbine for supplying the latter with air under pressure, a combustion chamber adapted to heat this air before its admission into said turbine and arranged between the delivery side of said air compressor and the inlet side of said turbine, a source of combustible gas, at least one rotary combustible gas compressor mechanically separated from said motive turbine and the inlet side of which is connected to said source of combustible gas, said compressor being adapted to force the combustible gas into said combustion chamber under the pressure prevailing inside said chamber, an auxiliary turbine supplied with hot air under pressure from said combustion chamber, said auxiliary turbine being mechanically separated from said motive turbine and being adapted to drive both said air and said combustible gas compressors at a rotary speed substantially equal to the value of the operating point of said compressors at maximum efficiency, piping means for delivering an extra amount of thermal energy in form of a liquid fuel into said combustion chamber, and valve means on said piping means for regulating the amount of extra fuel supply to said combustion chamber.

References Cited in the file of this patent

UNITED STATES PATENTS

| | | |
|---|---|---|
| 1,451,798 | Williams | Apr. 17, 1923 |
| 1,988,456 | Lysholm | Jan. 22, 1935 |
| 2,078,956 | Lysholm | May 4, 1937 |
| 2,365,616 | Zweifel | Dec. 19, 1944 |
| 2,371,889 | Hermitte | Mar. 20, 1945 |
| 2,374,239 | Sedille | Apr. 24, 1945 |
| 2,574,495 | Parker, Jr. | Nov. 13, 1951 |
| 2,621,476 | Sedille | Dec. 16, 1952 |

FOREIGN PATENTS

| | | |
|---|---|---|
| 351,417 | Germany | Apr. 7, 1922 |